United States Patent [19]

Weischedel, deceased

[11] Patent Number: 4,558,264
[45] Date of Patent: Dec. 10, 1985

[54] CURRENT CONTROL METHOD AND CIRCUIT FOR ELECTRONICALLY-COMMUTATED MOTORS

[75] Inventor: Richard C. Weischedel, deceased, late of Camillus, N.Y., by Anne S. Weischedel, executor

[73] Assignee: General Electric Company, Louisville, Ky.

[21] Appl. No.: 662,347

[22] Filed: Oct. 18, 1984

[51] Int. Cl.$^4$ ............................................. H02P 6/02
[52] U.S. Cl. .................................. 318/254; 318/138; 318/439
[58] Field of Search ............... 318/138, 254, 254 A, 318/439

[56] References Cited

U.S. PATENT DOCUMENTS

| | | | |
|---|---|---|---|
| 4,107,593 | 8/1975 | Anderson | 318/138 |
| 4,250,435 | 2/1981 | Alley | 318/138 |
| 4,303,871 | 12/1981 | Berry | 318/138 |
| 4,350,943 | 9/1982 | Pritchard | 318/696 |
| 4,368,411 | 1/1983 | Kidd | 318/254 |
| 4,393,339 | 7/1983 | Kimura | 318/254 |
| 4,409,524 | 10/1983 | Neilsen et al. | 318/138 |
| 4,490,661 | 12/1984 | Brown et al. | 318/254 X |

FOREIGN PATENT DOCUMENTS

| | | | |
|---|---|---|---|
| 56-10091 | 2/1981 | Japan | 318/138 |
| 56-46695 | 4/1981 | Japan | 318/254 |

Primary Examiner—B. Dobeck
Assistant Examiner—Bentsu Ro
Attorney, Agent, or Firm—H. Neil Houser; Radford M. Reams

[57] ABSTRACT

Techniques for controlling motor winding current by employing ON/OFF duty cycle control switching between an upper and a lower current threshold to establish an average motor winding current approximately midway between the two thresholds. Rising current during ON time intervals is directly measured, and an upper threshold detector is employed to turn OFF a switching transistor when the upper current threshold is reached. Rather than directly measuring decay or flyback current which circulates in the motor windings through free-wheeling diodes for comparison against the lower current threshold, the decay time is simulated. A lower current threshold detector and an upper current threshold detector are employed. Following winding energization, the lower threshold current detector starts a timing device. The upper threshold current detector subsequently stops the timing device, and turns OFF the switching transistor. Winding current then decays, and the decay time needed to reach the lower threshold is simulated by waiting for a decay time interval which is a function of the measured rise time interval.

12 Claims, 4 Drawing Figures

CURRENT CONTROL METHOD AND CIRCUIT FOR ELECTRONICALLY-COMMUTATED MOTORS

BACKGROUND OF THE INVENTION

The present invention relates to current control methods and circuits for maintaining a desired average current through the windings of an electronically-commutated motor (ECM) by employing ON/OFF duty cycle control switching.

Electronically-commutated motors typically include a permanent magnet motor and a plurality of field windings which are sequentially energized to produce a rotating electromagnetic field. Such motors are advantageously adaptable to precise control of speed and direction. High torque is available at all speeds, and rotor position is often repeatable without error and independent of load.

A variety of techniques have been proposed for controlling such motors, such as the technique disclosed in commonly-assigned Alley et al U.S. Pat. No. 4,250,435, the entire disclosure of which is hereby expressly incorporated by reference. In the exemplary application disclosed in Alley et al U.S. Pat. No. 4,250,435, an electronically-commutated motor is employed in a direct-drive domestic clothes washing machine. This particular application well illustrates the capabilities of electronically-commutated motors. In general, motor speed and direction are controlled by controlling the frequency and order of commutation, i.e., the sequential energization of the various windings in the motor. At the same time, motor winding current is controlled in order to dynamically match motor torque to the load requirements. As is demonstrated in the above-incorporated Alley et al Pat. No. 4,250,435, commutation frequency and motor winding current control are closely related to each other in practical and efficient ECM motor control systems.

Thus, at least one form of ECM control system dynamically establishes or commands a particular motor winding current to be maintained, and ON/OFF duty cycle control circuitry maintains the desired average current by energizing and de-energizing the motor windings through one or more controlled switches, such as switching transistors.

The present invention is directed to techniques for effecting current control, and it is assumed that the desired current to be maintained is established or commanded by other means, such as are disclosed in Alley et al U.S. Pat. No. 4,250,435. Similarly, it is assumed that suitable means are provided for establishing the rate of commutation, and thus velocity of the motor.

One prior art approach to motor winding current control is to measure motor winding current at all times during the ON/OFF switching process. Upper and lower current threshold values are established as a function of the desired average current to be maintained, which typically is midway between the two current thresholds. In operation, the switching transistor is turned ON energizing one or more of the windings. Current then rises during a rise time interval. When the upper current threshold is reached, the switching transistor is turned OFF to de-energize the motor winding or windings. Collapsing magnetic fields then induce a voltage which drives flyback current which flows through one or more free-wheeling diodes. The flyback current decreases during a decay time interval. When this flyback current reaches the lower current threshold, the switching transistor is turned ON to again energize the selected winding or windings. This process repeats indefinitely. Specific examples of this approach are disclosed in, for example, Pritchard U.S. Pat. No. 4,350,943 and Nielsen et al U.S. Pat. No. 4,409,524.

One disadvantage of this approach, depending upon the topology of the particular circuit involved, is that it may be difficult to measure actual motor winding current during the decay interval, i.e., the flyback current. Thus, the Nielsen et al circuit, which has a free-wheeling diode connected generally in parallel with each switching transistor, separates the ground return paths of the switching transistors and the free-wheeling diodes, and provides an individual current-sensing resistor in series with each of these ground return paths. This permits rise current as well as decay current to be directly sensed.

Pritchard illustrates the complexity of the problem. Thus, the Pritchard circuit attempts to control motor current between two thresholds, and employs a compensation technique which employs a specialized trifilar wound transformer.

A variant approach to controlling current in a motor winding is disclosed in Anderson U.S. Pat. No. 4,107,593. The Anderson circuit includes a free-wheeling diode in parallel with each of three stepper motor windings which are energized through individual switching transistors. Anderson employs only a single current sensing circuit to measure current when one of the transistor switches is turned ON to energize a particular winding. As in the upper and lower current threshold approach described above, the transistor switch is turned OFF when current reaches a predetermined threshold. However, rather than measuring winding current during the decay or flyback current interval for comparison against a lower current threshold, a timing circuit maintains the switching transistor OFF for a fixed predetermined time period, after which energization is allowed to continue. While motor winding current is thus effectively limited, this Anderson control approach lacks the necessary flexibility for use in an electronically-commutated motor intended for operation over a wide range of speed and loading conditions. Specifically, the fixed OFF time interval of the Anderson circuit effectively limits the maximum average current which can be supplied to the motor winding. Perhaps more significantly, unless motor operating conditions are known and substantially unvarying, motor winding current cannot be well-controlled to a particular average value since there is no particular lower current threshold. While this may be perfectly acceptable in the particular stepper motor application which Anderson envisions, it is contrary to a motor control system whose object is to maintain optimum motor operation at all times.

SUMMARY OF THE INVENTION

Accordingly, it is an object of the invention to provide a motor winding current control system and method of the general type which employs ON/OFF switching to maintain motor winding current between two current thresholds and thereby to establish a controllable average motor winding current.

It is another object of the invention to provide such a control system and method which avoids the difficulties attendant to measuring decay current in a flyback winding.

Briefly, in accordance with the invention, it is recognized that ON/OFF switching to maintain current between two thresholds can be achieved by simulating the decay time without actually measuring the decay or flyback current. In the particular type of motor here concerned, when voltage is applied to one or several motor windings in series, current builds up during a rise time interval. The actual rate of current buildup depends upon a number of factors, such as applied voltage, the particular speed, the particular load existing at that time, as well as upon inherent characteristics of the motor. When voltage to the windings is switched OFF, current then decays through a free-wheeling diode. Significantly, the rate of current decay, particularly in a "Y" connection, is nearly the same as the rate of current rise, or at least a predictable function thereof, since the amplitude of the voltage across the winding is nearly the same in the ON state and the flyback state.

Embodiments of the invention advantageously utilize this characteristic to maintain average current by sensing supply line current, and comparing this current to lower and upper current thresholds during the rise time interval only. When the first current threshold is reached, a timing device is started. When the second threshold is reached, the timing is stopped, and power is turned off, beginning the flyback or decay interval. Rather than actually measuring the decay current, decay time is simulated by waiting for an OFF time interval which is a function of the measured ON time, typically equal to the measured ON time.

In an exemplary implementation, a digital counter is used as a timer, supplied from a constant-rate clock pulse source. When the lower threshold is reached, the mode control of the counter is set to count up. When the second threshold is reached, the winding is de-energized, and the counter mode control is set to count down. When the count returns to zero, power is reapplied to the motor, and the process is repeated.

Briefly, and in accordance with one particular embodiment of the invention, there is provided a control circuit for maintaining a desired average current through the windings of an electronically-commutated motor supplied from an electric power source and of the type including a plurality of windings selectively energized and de-energized from the power source. The circuit includes at least one switching element for controllably energizing at least one of the windings from the power source. A plurality of free-wheeling diodes are connected to the windings for providing paths for current driven by flyback voltage induced by collapsing magnetic fields upon winding de-energization. In an exemplary embodiment, at least one of the free-wheeling diodes is effectively connected in shunt with the windings for providing a circulating flyback current path.

Lower and upper threshold comparison means are provided. The lower threshold comparison means is responsive to the magnitude of current supplied from the source to the motor windings and is operable to provide a signal when current is at or above a lower threshold level. The upper threshold comparison means is responsive to the magnitude of current supplied from the source to the motor windings and is operable to provide a signal to the switching element for de-energizing the winding when current is at or above an upper threshold current level.

In the disclosed implementation, two comparators are employed corresponding to the lower and upper threshold comparison means. However, it will be appreciated that the lower and upper threshold comparison means can comprise a single comparator with appropriate resistive biasing and output logic elements.

The control circuit of the invention also includes an adaptive timing circuit connected to receive the signals from the lower and upper threshold comparators and operable, upon energization of the motor, to repeatedly: (1) measure the ON time required for current to rise from the lower threshold current level to the upper threshold current level at which the switching element de-energizes the winding; (2) establish an OFF time interval as a function of the measured ON time; and (3) cause re-energization of the winding at the end of the OFF time interval.

In one embodiment, the adaptive timing circuit establishes an OFF time interval which at least approximately equals the measured ON time.

On particular form of adaptive timing circuit includes a timer of the type which measures an input time interval and provides an output time interval as a function of the input time interval. This timer may be implemented either in an up/down digital timer, or by analog means, such as by charging a capacitor from a constant current source to measure the ON time interval, and then discharging the capacitor through a constant-current sink until capacitor voltage is zero to establish the OFF time interval.

In either case, connections are provided between the threshold comparison means and the timer for measuring, as the input time interval, the ON time required for current to increase from the lower threshold current level to the upper threshold current level. A connection is provided between the timer and the switching element for establishing an OFF time interval during the timer output time interval.

The invention also provides a method for maintaining a desired average current through the windings of an electronically-commutated motor supplied from an electric power source and of the type including a plurality of windings selectively energized and de-energized from the source, and also including a plurality of free-wheeling diodes connected to the windings for providing paths for current driven by flyback voltage induced by collapsing magnetic fields upon winding de-energization. The method includes the steps of energizing at least one of the windings from the power source, measuring current supplied from the power source to the winding, and repeatedly: (1) measuring the ON time required for current to rise from a lower threshold current level to an upper threshold current level; (2) de-energizing the winding when the upper threshold current level is reached; (3) establishing an OFF time interval as a function of the measured ON time; and (4) re-energizing the winding at the end of the OFF time interval. In one example, the established OFF time interval at least approximately equals the measured ON time.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
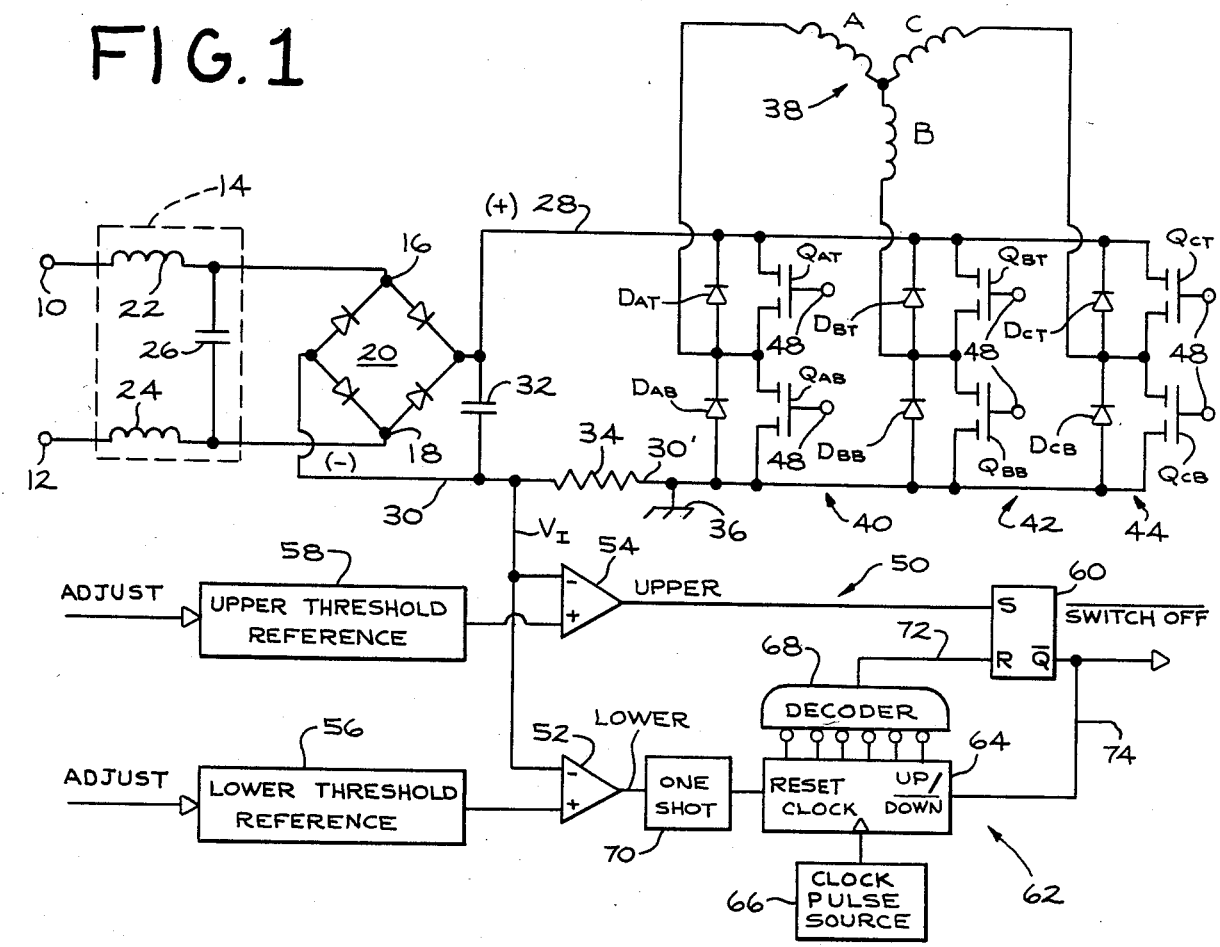
FIG. 1 is an electrical schematic diagram of a portion of current control circuitry in accordance with the invention including a power-handling circuit for controlling a three-phase electronically-commutated motor, and an adaptive timing circuit responsive to current supplied to the motor windings.

Referring first to FIG. 1, 120 volt, 60 Hz AC from a conventional household branch circuit is applied to AC input terminals 10 and 12 connected through an electromagnetic interference (EMI) filter 14 to the AC input terminals 16 and 18 of a full wave bridge rectifier 20. As indicated, the EMI filter 14 may comprise a pair of series inductors 22 and 24, each for example having an inductance of 250 microhenries, with a 0.05 microfarad capacitor 26 in shunt on the output side of the EMI filter 14. For additional system protection a 150 volt metal oxide varistor (MOV) (not shown) may be connected on the output side of the EMI filter 14.

Pulsating DC output from the bridge rectifier 20 is applied to respective positive and negative DC supply conductors 28 and 30, and a low value filter capacitor 32 is connected across the DC supply conductors 28 and 30. The capacitor 32 is sized to further reduce electromagnetic interference and to provide adequate local energy storage for supplying chopping components of current while, at the same time, having minimum adverse impact upon input power factor. The voltage across the DC supply conductors 28 and 30 thus remains a relatively high ripple DC input voltage or, expressed alternatively, substantially unfiltered rectified AC power.

In order to sense the instantaneous current supplied to the remaining elements of FIG. 1, a 0.05 ohm current sensing resistor 34 is connected in series between the negative DC supply conductor 30 and an extension 30' thereof. A current sensing line $V_I$ is connected on one terminal of the current sensing resistor 34 to sense the voltage drop thereacross. The current sensing signal on the $V_I$ line is referenced to a circuit reference point 36 connected to the extended negative DC supply conductor 30'.

Also shown in FIG. 1 is an electronically commutated bi-directional, variable speed DC motor generally designated 38 intended for application in a direct drive clothes washing machine. More particularly, the motor 38 is represented by stator windings A, B and C, connected in a "Y" configuration. It will be appreciated that the motor 38 requires a rotor such as a conventional permanent magnet rotor (not shown) which rotates in either direction depending upon the energization sequence of the windings A, B and C.

Connected to the windings A, B and C of the motor 38 and supplied from the positive and negative DC supply conductors 28 and 30' are three power switching sections respectively designated 40, 42 and 44. Generally speaking, each of the switching sections 40, 42 and 44 comprises a power switch which is capable of connecting the end of the respective motor winding A, B or C to either the positive supply line 28 or the negative supply line 30'. For motor 38 winding A, the top switch is designated $Q_{AT}$, and the bottom power switch is designated $Q_{AB}$. The same nomenclature is employed for similar power switches the other two switching sections 42 and 44.

For purposes of illustration, the power switches are illustrated as power field effect transistors capable of switching 200 volts DC, with three amperes average current, and ten amperes peak current. However, other switching devices may equally well be employed, such as bipolar transistors or insulated-gate transistors.

In order to provide current paths for decay (flyback) current induced by collapsing magnetic fields as the individual windings A, B and C are de-energized, freewheeling diodes are connected to the windings A, B and C. In the particular circuit illustrated, six freewheeling diodes designated $D_{AT}$, $D_{AB}$, $D_{BT}$, $D_{BB}$, $D_{CT}$, and $D_{CB}$ are provided and connected electrically in parallel with respective ones of the field-effect transistor power switches and oppositely poled with respect thereto. Despite the apparent connection of the freewheeling diodes across the switching transistors, analysis of the circuit operation will reveal that the freewheeling diodes in actuality are effectively connected in shunt with the motor windings to provide paths for circulating flyback current in the motor windings.

In the general operation of the power switching circuit of FIG. 1 as thus far described, suitable gate drive signals are applied to the power switching transistor gate terminals 48. As is more fully explained hereinbelow, both the top switching transistors $Q_{AT}$, $Q_{BT}$ and $Q_{CT}$ and the bottom switching transistors $Q_{AB}$, $Q_{BB}$ and $Q_{CB}$ are used for the commutating function to sequentially energize the windings in appropriate pairs to cause motor rotation in a particular direction and at a particular velocity. Whichever one of the bottom switching transistors $Q_{AB}$, $Q_{BB}$ and $Q_{CB}$ happens to be active depending upon the particular point in the commutation cycle is additionally rapidly switched ON and OFF in chopper fashion (duty cycle control) to control the average current through whichever pair of the motor windings A, B and C is energized at any given time. In this manner, effective applied motor voltage is controlled to be that required to maintain motor velocity, with the inductance of the motor windings A, B and C providing current smoothing.

More particularly, in accordance with the invention the ON/OFF switching of the bottom transistors $Q_{AB}$, $Q_{BB}$ and $Q_{CB}$ is under control of simulation circuitry, generally designated 50, which simulates the ON/OFF duty cycle control of the general type which continuously measures motor winding current and maintains this current at an average value between an upper and lower thresholds.

In the simulation circuitry 50, the $V_I$ sensing line from the current-sensing resistor 34 is applied to the inverting (−) inputs of a lower threshold comparator 52 which drives a LOWER line and of an upper threshold comparator 54 which drives an UPPER line. The comparator 52 and 54 non-inverting (+) inputs serve as reference inputs and are respectively supplied from a lower threshold reference voltage source 56 and an upper threshold reference voltage source 58. The comparators 52 and 54 comprise conventional integrated circuit voltage comparators, current to voltage conversion being accomplished by the current-sensing resistor 34.

For an electronically-commutated motor controllable over a wide range of operating conditions, the lower and upper threshold reference sources 56 and 58 are adjustable, as indicated. It will be appreciated that a number of variations are possible. For example, the lower and upper threshold reference voltage sources may be combined into a single circuit with a single adjustment input and which provides two reference outputs with a fixed offset therebetween. Similiarly, a variety of specific comparator circuits may be employed. Another example is the one disclosed in Alley et al U.S. Pat. No. 4,250,435. Depending upon the particular comparator circuit employed, the lower 52 and upper 54 comparators may be supplied from a single reference voltage source, with a resistive network (not shown) associated with the comparators 52 and 54 themselves to establish a predetermined offset between the thresholds. As another variation, a single integrated circuit voltage comparator may be employed with appropriate resistive biasing, for example to establish hysteresis, in combination with suitable digital logic elements connected to the comparator output.

In any event, in the overall operation of the comparator circuits, the lower threshold comparator 52 is responsive to the magnitude of current supplied from the DC power source to the motor winding 38 as sensed via the resistor 34 and is operable to drive the LOWER line to logic high when current is at or above a lower threshold current level.

Similarly, the upper threshold comparator 54 is responsive to the magnitude of current supplied from the DC power source to the motor windings 38 and is operable to drive the UPPER line to logic high when current is at or above an upper threshold current.

Figure 3:
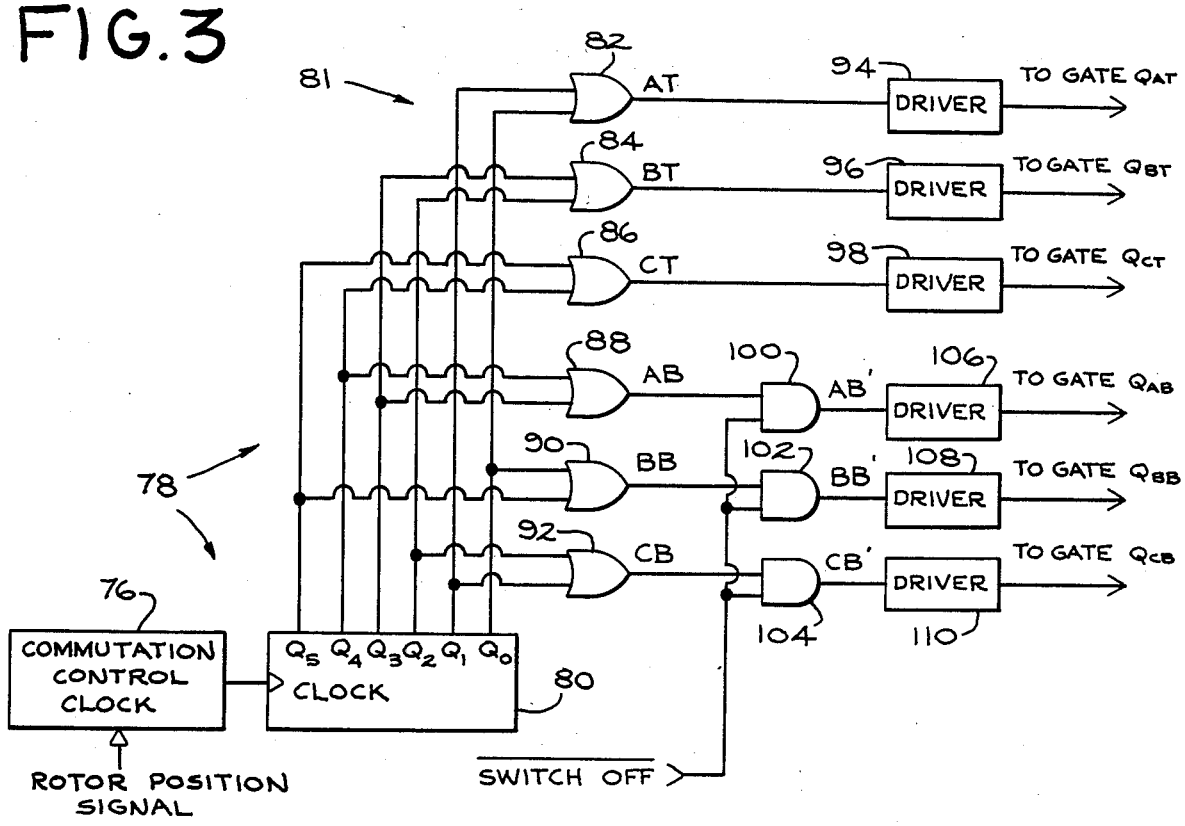
FIG. 3 is a an electrical schematic diagram of an exemplary commutation sequencer circuit for driving the FIG. 1 power-handling circuits.

The UPPER line is connected to the Set (S) input of a Set/Reset flip-flop 60, the $\overline{Q}$ output of which drives a $\overline{\text{SWITCH OFF}}$ line. The $\overline{\text{SWITCH OFF}}$ line is in turn connected to the commutation and driver circuitry shown in FIG. 3. While the circuitry of FIG. 3 is described in detail hereinbelow, for present purposes it is sufficient to state that, whenever the $\overline{\text{SWITCH OFF}}$ line is low, whichever of the bottom power switching transistors $Q_{AB}$, $Q_{BB}$ or $Q_{CB}$ is currently selected in accordance with the commutation sequence is turned off to de-energize the motor windings A, B and C until such time as the $\overline{\text{SWITCH OFF}}$ line again goes high. Thus, the $\overline{\text{SWITCH OFF}}$ line may be viewed as the actual control line which controls the ON/OFF duty cycle switching of the motor windings.

The remainder of the circuitry 50 of FIG. 1 comprises an adaptive timing circuit 62 and includes, in addition to the Set/Reset flip-flop 60, an up/down digital counter 64 driven by a fixed-rate clock pulse source 66, a decoder 68 for recognizing a particular predetermined state of the counter 64, and a monostable multivibrator (one shot) 70 connected between the LOWER line from the lower threshold comparator 52 and the counter 64 RESET input for conditioning the counter reset signal.

Referring also to the timing diagram of FIG. 2, the operational function of the adaptive timing circuit 62 is repetitive, and is as follows: Upon energization of the motor 38 windings, the adaptive timing circuit 62 measures the ON time or rise time required for current to increase from the lower threshold current level (the reaching of which is indicated by the LOWER line going high) to the upper threshold current level (the reaching of which is indicated by the UPPER line going high). As already described above, when the UPPER line goes high, the $\overline{\text{SWITCH OFF}}$ line is driven low through the flip-flop 60, and this in turn causes one of the power switching elements $Q_{AB}$, $Q_{BB}$ or $Q_{CB}$ to de-energize whichever pair of motor 38 windings A, B and C which happens to be energized at that particular time in accordance with the commutation sequence. At that point, the adaptive timing circuit 62 establishes an OFF time or decay time interval as a function of the measured ON time. In the particular embodiment of FIG. 1, the OFF time interval approximately equals the measured ON time. At the end of the OFF time interval, the adaptive timing circuit 62 causes re-energization of the selected motor windings, A, B and C by causing the $\overline{\text{SWITCH OFF}}$ line to again go high.

Figure 2:
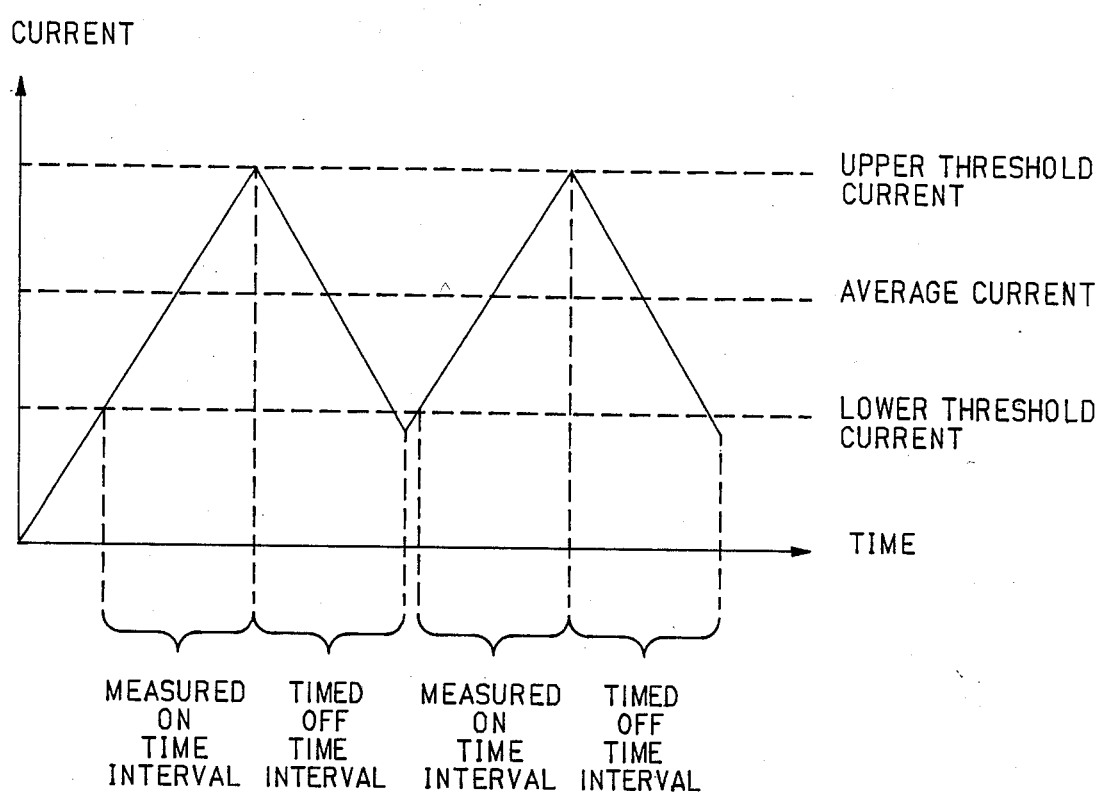
FIG. 2 is a timing diagram depicting current as a function of time during operation of the FIG. 1 circuit.

As depicted in FIG. 2, the flyback current decays at a rate related to the rate of current rise, typically about the same, or slightly faster due to circuit losses. Based on this observation, decay time is simulated without actually measuring current during the decay time interval.

Considering the adaptive timing circuit 62 in greater detail, it will be appreciated that the up/down digital counter 64, together with the clock pulse source 66, comprises a timer of the type which measures an input time interval and provides an output time interval as the function of the input time interval. Thus, in operation, when the lower threshold current level is reached, the LOWER output line of the comparator 52 goes high, and a pulse output from the one shot 70 resets the counter 64 to an initial state, for example zero. The decoder 68 recognizes this state, and an output 72 thereof goes high. The output line 72 is connected to the Reset (R) input of the Set/Reset flip-flop 60, and thus insures that the flip-flop 60 is initially in its reset state, during which the $\overline{Q}$ output is high. In addition, a line 74 from the flip-flop 60 $\overline{Q}$ output to an UP/$\overline{\text{DOWN}}$ input of the counter 64 ensures that the counter 64 is commanded to count up.

During the ON or rise time interval, current supplied to the motor windings A, B and C as sensed by the current sensing resistor 34 increases from the lower current threshold level to the upper threshold current level, and the counter 64 accumulates a count of clock pulses from the source 66 as a direct function of the duration of the ON time interval and thus measures it. When the upper current threshold level is reached, the UPPER line goes high, setting the flip-flop 60. This causes the flip-flop 60 $\overline{Q}$ output and the $\overline{\text{SWITCH OFF}}$ line to go low, de-energizing the motor windings A, B and C. At the same time the counter 64 is commanded to count down, and at the same rate, under the control of the clock pulse source 66.

As an example of operation at a specific point during the commutation cycle, it may be assumed that the commutation sequence in calling for transistors $Q_{AT}$ and $Q_{BB}$ to be ON, thus energizing motor windings A and B in series from the DC power supply conductors 28 and 30'. The rising current thus flows through the current-sensing resistor 34 to be processed by the simulation circuitry 50 as described above.

When the $\overline{\text{SWITCH OFF}}$ line goes low, the switching transistor $Q_{BB}$ turns OFF for the OFF time or decay time interval (even though the transistor $Q_{BB}$ would otherwise be ON in accordance with the commutation sequence). This de-energizes the windings A and B, and the collapsing magnetic field induces a voltage in the windings A and B opposite to the voltage which was applied thereto, this induced voltage then driving flyback current. Considering the flyback current path in detail, it will be appreciated that, when the windings A and B are de-energized, collapsing magnetic fields cause the outer end of winding A to be negative with respect to the outer end of winding B, just the opposite of the polarity of the applied voltage when transistor $Q_{BB}$ was ON. Starting for purposes of analysis at the outer end of winding B, positive current flows from winding B through free-wheeling diode $D_{BT}$ (not the diode $D_{BB}$ across the transistor $Q_{BB}$ just turned OFF) to the positive supply line 28. Since switching transistor $Q_{AT}$ is still turned ON in accordance with the commutation sequence, transistor $Q_{AT}$ completes the flyback current path back to the outer end of winding A. Thus, the windings A and B are effectively shunted during flyback intervals by a network comprising diode $D_{BT}$, allowing flyback current to circulate in the windings. During flyback intervals, no current circulates through the power supply. In particular, no current flows through the current-sensing resistor 34.

In any event, no attempt is made to directly measure the flyback current during the decay interval. Rather, the decay time is simulated by the circuitry 50, as described above.

Thus, during the decay time interval, the up/down counter 64 counts down. When the count of zero is reached, the output of the decoder 68 again resets the flip-flop 60 to begin another cycle. As noted above with reference to FIG. 2, due to circuit losses, typically the flyback current decays slightly faster than the current rise such that, at the end of the OFF time interval, the current is below the threshold. Thus, when the exemplary switching transistor $Q_{BB}$ is again turned on, current rises through the lower threshold, resetting the counter 64 at the appropriate moment.

If it is desired to simulate a decay time which is not equal to the rise time, but which is a linear function thereof, the adaptive timing circuit 62 of FIG. 1 can readily be modified to alter the frequency of the clock pulse source 66 depending upon whether a risetime interval or a decay time interval is occurring. Another approach is to either preset the counter 64 to a count other than zero, or to arrange the decoder 68 to detect a count other than zero.

As another modification, rather than a digital counter in the adaptive timing circuit 62, an analog timer (not shown) may be employed. A suitable analog timer charges a capacitor from a constant-current source during the rise or ON time interval. The capacitor voltage then reflects the duration of the measured ON time. To establish the OFF time interval, the capacitor is discharged through a constant-current sink until a zero voltage or other lower reference voltage is reached.

Referring now to FIG. 3, an electrical schematic diagram of typical commutation circuitry is shown, including a connection for the $\overline{\text{SWITCH OFF}}$ line. Important elements of the FIG. 3 circuitry are a commutation control clock 76 and a rotation sequencer 78 comprising a bi-directional ring counter 80 and driver logic 81, in turn comprising six OR gates 82, 84, 86, 88, 90 and 92, each corresponding to one of the power switching transistors $Q_{AT}$ through $Q_{CB}$ of FIG. 1.

The function of the commutation control clock 76 is to output periodic commutation sequence advancing signals to the bi-directional ring counter 80 CLOCK input. As is known in the art, there are a variety of techniques for determining when the commutation sequence is to be advanced. Typically, these techniques require knowledge of the actual rotor position. Thus, a rotor position signal is shown as an input to the commutation control clock 76. Many such means are possible, such as light choppers or Hall effect sensors. One particularly advantageous approach is that which is described in commonly-assigned Wright U.S. Pat. No. 4,162,435, which also happens to be the approach employed in the above-incorporated Alley et al U.S. Pat. No. 4,250,435. It will be appreciated that the present invention is not directed to the specific details of the commutation control or the manner in which current threshold signals are determined. Rather, the present invention is directed to an implementation technique which assumes the existence of a basic motor control system in accordance with known principles.

Figure 4:
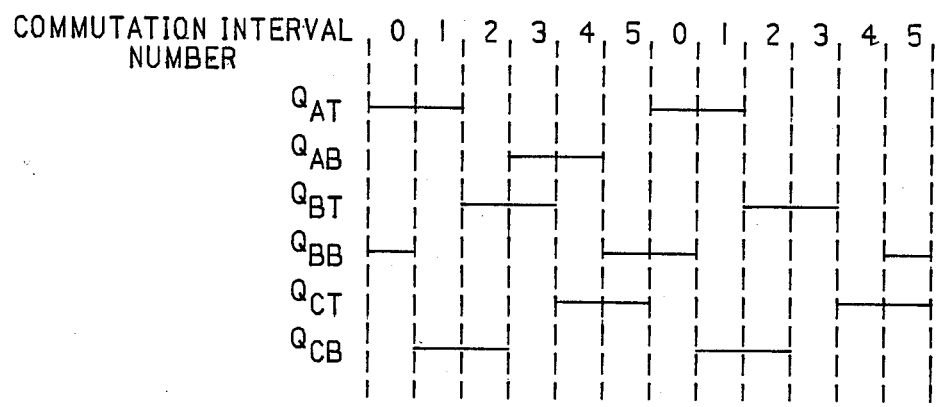
FIG. 4 is a commutation sequence chart depicting the operation of the FIG. 3 commutation sequencer.

Referring briefly to the commutation sequence chart of FIG. 4, the series of lines designated $Q_{AT}$ through $Q_{CB}$ designates specifically during which of the commutation intervals the power switching transistors of FIG. 1 are energized. It will be seen that at any instant, one of the top switching transistors $Q_{AT}$, $Q_{BT}$ or $Q_{CT}$ is energized, and one of the bottom switching transistors $Q_{AB}$, $Q_{BB}$ or $Q_{CB}$ is energized, thus energizing two of the three motor windings A, B and C by appropriately connecting respective ends thereof to the positive and negative DC supply conductors 28 and 30'. The commutation sequence shown results in motor rotation in one direction as interval numbers repeatedly count up going from left to right across the drawing sheet, and results in motor rotation in the other direction as interval numbers repeatedly count down going from right to left across the drawing sheet.

Referring again to FIG. 3, to implement the FIG. 4 commutation sequence, the six outputs $Q_0$ through $Q_5$ of the ring counter 80 are appropriately connected to the inputs of the OR gates of the driver logic 81. For example, the transistor $Q_{AT}$ is switched on during commutation interval numbers 0 and 1. Accordingly, the inputs of the OR gate 82 are connected to the $Q_0$ and $Q_1$ outputs of the ring counter 80.

The three upper switching transistors $Q_{AT}$, $Q_{BT}$ and $Q_{CT}$ are used for commutation only. Thus, the output lines AT, BT and CT of the respective OR gates 82, 84 and 86 are connected directly to suitable transistor gate drivers 94, 96 and 98 which are of conventional design compatible with the gate drive requirements of the particular power switching transistors employed.

As previously described, the lower switching transistors of FIG. 1, $Q_{AB}$, $Q_{BB}$ and $Q_{CB}$ are rapidly switched ON and OFF during each commutation interval to provide motor winding current control. Thus, in order to turn off the selected one of the lower switching transistors $Q_{AB}$, $Q_{BB}$ or $Q_{CB}$ when the upper threshold current limit is reached and the $\overline{\text{SWITCH OFF}}$ line goes low, the $\overline{\text{SWITCH OFF}}$ line is connected to enabling inputs of three AND gates 100 and 102 and 104 having their signal inputs respectively connected to lines AB, BB and CB from the OR gates 88, 90 and 92. The outputs of the AND gates 100, 102 and 104 supply respective lines AB', BB', and CB' which, in turn, are connected to respective transistor gate driver circuits 106, 108 and 110.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A control circuit for maintaining a desired average current through the windings of an electronically-commutated motor supplied from an electric power source and of the type including a plurality of windings selectively energized and de-energized from the source, said circuit comprising:

at least one switching element for controllably energizing at least one of the windings from the power source;

a plurality of free-wheeling diodes connected to the windings for providing paths for current driven by flyback voltage induced by collapsing magnetic fields upon winding de-energization;

lower threshold comparison means responsive to the magnitude of current supplied from the source to the motor windings for providing a signal when current is at or above a lower threshold current level;

upper threshold comparison means responsive to the magnitude of current supplied from the source to the motor windings for providing a signal to said switching element for de-energizing said at least one winding when current is at or above an upper threshold current level; and an adaptive timing circuit connected to receive the lower and upper threshold signals and operable, upon energization of the motor, to repeatedly:

measure the ON time required for current to a increase from the lower threshold current level to the upper threshold current level at which said switching element de-energizes said at least one winding;

establish an OFF time interval as a function of the measured ON time; and cause re-energization of said at least one winding at the end of the OFF time interval.

2. A control circuit in accordance with claim 1, wherein at least one of said free-wheeling diodes is effectively connected in shunt with said windings for providing a circulating flyback current path.

3. A control circuit in accordance with claim 1, wherein said adaptive timing circuit establishes an OFF time interval which at least approximately equals the measured ON time.

4. A control circuit in accordance with claim 2, wherein said adaptive timing circuit establishes an OFF time interval which at least approximately equals the measured ON time.

5. A control circuit for maintaining a desired average current through the windings of an electronically-commutated motor supplied from an electric power source and of the type including a plurality of windings selectively energized and de-energized from the source; said circuit comprising:

at least one switching element for controllably energizing at least one of the windings from the power source;

a plurality of free-wheeling diodes connected to the windings for providing paths for current driven by flyback voltage induced by collapsing magnetic fields upon winding de-energization;

lower threshold comparison means responsive to the magnitude of current supplied from the source to the motor windings for providing a signal when current is at or above a lower threshold current level;

upper threshold comparison means responsive to the magnitude of current supplied from the source to the motor windings for providing a signal to said switching element for de-energizing said at least one winding when current is at or above an upper threshold current level;

a timer of the type which measures an input time interval and provides an output time interval as a function of the input time interval;

connections between said comparison means and said timer for measuring, as the input time interval, the ON time required for current to increase from the lower threshold current level to the upper threshold current level; and a connection between said timer and said switching element for establishing an OFF time interval during the timer output time interval.

6. A control circuit in accordance with claim 5, wherein said timer comprises a digital counter supplied from a source of reference clock pulses.

7. A control circuit in accordance with claim 6, wherein said digital counter is an up/down digital counter configured to count from an initial counter state in one direction to measure the input time interval, and to count in the other direction back to the initial counter state to establish the output time interval.

8. A control circuit in accordance with claim 5, wherein at least one of said free-wheeling diodes is effectively connected in shunt with said windings for providing a circulating flyback current path.

9. A control circuit in accordance with claim 5, wherein said timer provides an output time interval which at least approximately equals the input time interval.

10. A control circuit in accordance with claim 8, wherein said timer proves an output time interval which at least approximately equals the input time interval.

11. A method for maintaining a desired average current through the windings of an electronically-commutated motor supplied from an electric power source and of the type including a plurality of windings selectively energized and de-energized from the source, and a plurality of free-wheeling diodes connected to the windings for providing paths for current driven by flyback voltage induced by collapsing magnetic fields upon winding de-energization, said method comprising:

energizing at least one of the windings from the power source;

measuring current supplied from the power source to the winding; and repeatedly:
measuring the ON time required for current to increase from a lower threshold current level to an upper threshold level;

de-energizing the winding when the upper threshold current level is reached;

establishing an OFF time interval as a function of the measured ON time, and re-energizing the winding at the end of the OFF time interval.

12. A method in accordance with claim 11, wherein the established OFF time interval at least approximately equals the measured ON time.

* * * * *